W. BRETHOUR.
DISH AND LID LIFTER.
APPLICATION FILED JAN. 3, 1911.
1,006,460.
Patented Oct. 24, 1911.
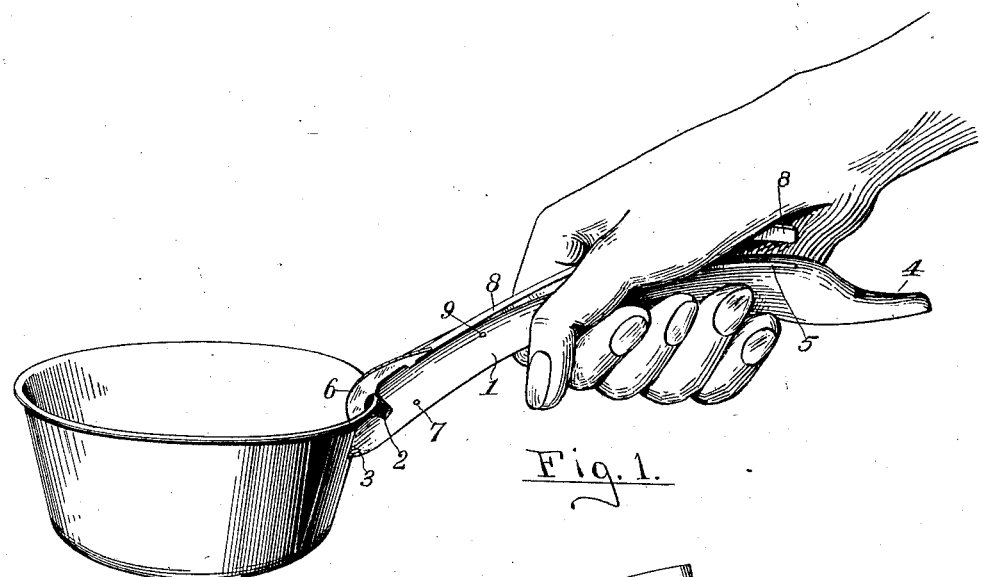
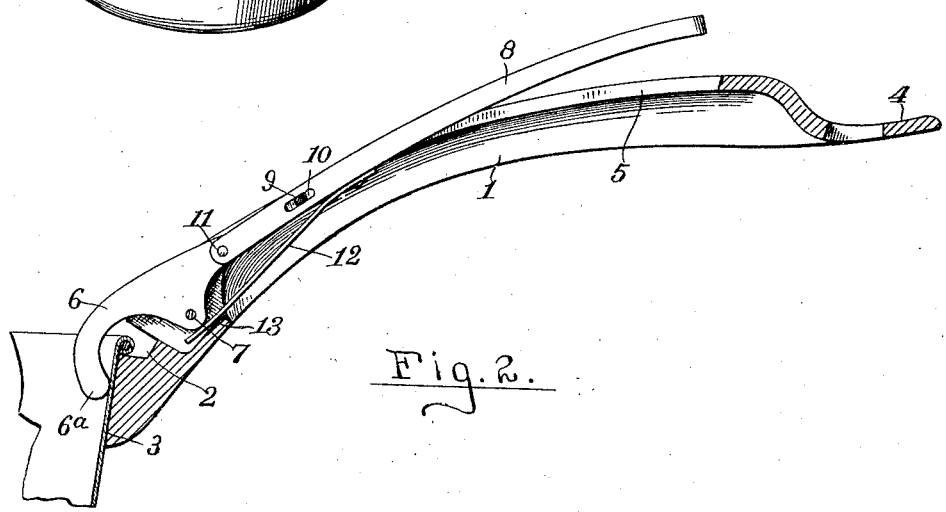
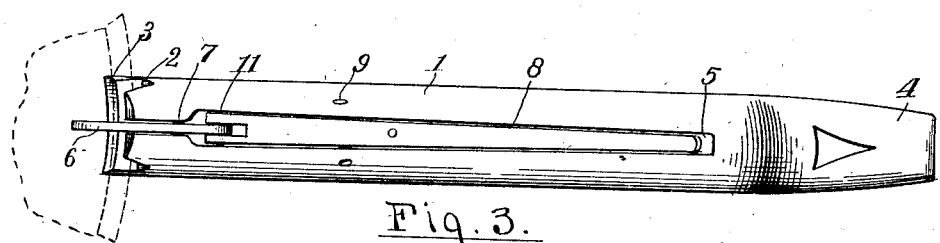
Witnesses
Harold O. Van Antwerp
Mae Parkin
Inventor
William Brethour
By Luther V. Moulton
Attorney

UNITED STATES PATENT OFFICE.

WILLIAM BRETHOUR, OF GRAND RAPIDS, MICHIGAN.

DISH AND LID LIFTER.

1,006,460.

Specification of Letters Patent.   Patented Oct. 24, 1911.

Application filed January 3, 1911.   Serial No. 600,599.

*To all whom it may concern:*

Be it known that I, WILLIAM BRETHOUR, a citizen of the United States of America, residing at Grand Rapids, in the county of Kent and State of Michigan, have invented certain new and useful Improvements in Dish and Lid Lifters; and I do hereby declare the following to be a full, clear, and exact description of the invention, such as will enable others skilled in the art to which it appertains to make and use the same.

My invention relates to improvements in dish and lid lifters and its object is to provide a convenient and reliable tool for lifting dishes of various kinds and the lids or covers of a range or stove, to provide a convenient utensil of this character for kitchen use and to provide the same with various new and useful features as hereinafter more fully described and particularly pointed out in the claim.

My device consists essentially of an integral body member forming a suitable handle, the same being adapted at one end to engage the outer side of a dish or vessel and at the other end to serve as a lid lifter for the lids or covers of a stove or range, a gripping jaw to engage the inner surface of a dish opposite the end of the handle, an operating lever pivoted in the handle and connected to the gripping jaw and a spring connected to the operating lever to normally move the jaw to open position as will more fully appear by reference to the accompanying drawings in which:—

Figure 1 is a perspective of a device embodying my invention as it appears when in use to lift an ordinary open dish; Fig. 2 a side elevation of the device with one side broken away to show the construction; and Fig. 3 is a plan view of the same.

Like numbers refer to like parts in all of the figures.

1 represents the body or handle portion of my device which is preferably of cast metal, made semi-cylindrical in cross-section throughout the middle portion, and provided with a longitudinal slot 5. One end of this handle is provided with a transverse recess 2 to receive the rim of a dish and a transversely extended and concave end surface 3 to engage the outer surface of a dish. The opposite end of this body or handle is provided with a suitable member 4 adapted to engage the recess in a stove lid or cover and lift the same in the usual way.

6 is a gripping jaw pivoted in the slot in the handle as at 7 and having a downwardly extended end terminating at 6ª opposite the concave portion 3 and adapted to force the dish firmly in contact therewith, when lifting the same. This gripping jaw is operated by means of a lever 8 pivoted within the slot 5 and having one end connected to the rear end of the gripping jaw 6 as at 11. This lever 8 is also provided with an elongated opening 10 being pivotally and slidably mounted on a transverse pin 9 in said opening and fixed in the body 1.

To normally move the lever and jaw to open position to receive the edge of a dish between the end 3 and the end 6ª, a spring 12 is secured to the lever 8 at one end, and extending within the body 1 beneath the lever and jaw, rests at its free end upon a spring support 13 in the lower part of the body 1, and thus serves to yieldingly lift the rear end of the lever 8 and move the end 6ª of the jaw away from the end 3 a suitable distance.

When in use, after being placed in position upon the edge of the dish, by grasping the body 1 and lever 8 the lever will be depressed relative to the handle and thus lift the rear end of the jaw and bring the forward end 6ª of the same forcibly against the inner surface of the dish and thus securely grasp the same whereby the dish may be conveniently lifted and moved about as preferred. By grasping the device near the end having the jaw, the end 4 may be used for lifting a stove lid. The shape of the ends of the device makes it convenient for use in a reversible position as described.

What I claim is:—

A device of the class described, comprising a handle having a longitudinal slot, one end of the handle being laterally extended and concave, and also provided with a recess, a spring support below one end of the slot, a gripping jaw pivoted in the slot and extending opposite said concave end, a lever connected at one end to the jaw and provided with a slot, a pivot pin in the handle and extending through the slot in the lever, and a spring attached to the lever and engaging the spring support.

In testimony whereof I affix my signature in presence of two witnesses.

WILLIAM BRETHOUR.

Witnesses:
HAROLD O. VAN ANTWERP,
LUTHER V. MOULTON.

Copies of this patent may be obtained for five cents each, by addressing the "Commissioner of Patents, Washington, D. C."